(12) United States Patent
Yoshino et al.

(10) Patent No.: US 11,836,226 B2
(45) Date of Patent: Dec. 5, 2023

(54) CONVERSION CABLE AND ELECTRONIC DEVICE

(71) Applicant: Sony Semiconductor Solutions Corporation, Kanagawa (JP)

(72) Inventors: Yoshitaka Yoshino, Kanagawa (JP); Satoru Tsuboi, Kanagawa (JP); Nao Maeda, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 435 days.

(21) Appl. No.: 17/256,749

(22) PCT Filed: Jun. 12, 2019

(86) PCT No.: PCT/JP2019/023193
§ 371 (c)(1),
(2) Date: Dec. 29, 2020

(87) PCT Pub. No.: WO2020/008823
PCT Pub. Date: Jan. 9, 2020

(65) Prior Publication Data
US 2021/0263999 A1    Aug. 26, 2021

(30) Foreign Application Priority Data
Jul. 2, 2018  (JP) .................. 2018-126131

(51) Int. Cl.
*G06F 21/10* (2013.01)
*G06F 3/16* (2006.01)
*H04L 9/32* (2006.01)

(52) U.S. Cl.
CPC .............. *G06F 21/10* (2013.01); *G06F 3/162* (2013.01); *H04L 9/32* (2013.01); *G06F 2221/0737* (2013.01)

(58) Field of Classification Search
CPC .. G06F 21/10; G06F 3/162; G06F 2221/0737; H04L 9/32
See application file for complete search history.

(56) References Cited

U.S. PATENT DOCUMENTS 10,038,676 B2 * 7/2018 Khalid ................. H04L 9/0841
2004/0042413 A1 * 3/2004 Kawamura ......... H04W 12/122
370/252

(Continued)

FOREIGN PATENT DOCUMENTS

JP   2004-065363 A   3/2004
JP   2008-186354 A   8/2008

(Continued)

OTHER PUBLICATIONS

International Search Report issued in International Patent Application No. PCT/JP2019/023193 dated Jul. 23, 2019 and English translation of same. 5 pages.

(Continued)

*Primary Examiner* — Abiy Getachew
(74) *Attorney, Agent, or Firm* — K&L Gates LLP

(57) ABSTRACT

There is provided a conversion cable including: a connector to be connected to an electronic device that outputs a digital voice signal; an IC having a function of converting a digital voice signal supplied through the connector into an analog voice signal; and an output unit for an analog voice signal output from the IC, in which the IC holds an encryption key for permitting the electronic device to output a digital voice signal that requires copyright protection.

9 Claims, 12 Drawing Sheets

(56) References Cited

U.S. PATENT DOCUMENTS

| | | | |
|---|---|---|---|
| 2004/0122542 A1* | 6/2004 | Yang | H04M 1/6066 |
| | | | 381/2 |
| 2006/0147139 A1 | 7/2006 | Bouru | |
| 2009/0033552 A1* | 2/2009 | Kirmuss | H04B 1/3805 |
| | | | 701/467 |
| 2018/0011994 A1 | 1/2018 | Boesen | |
| 2019/0110119 A1 | 4/2019 | Yoshino et al. | |

FOREIGN PATENT DOCUMENTS

| | | |
|---|---|---|
| JP | 2010-183671 | 8/2010 |
| WO | WO2003/013068 A1 | 2/2003 |
| WO | WO2004/086235 A1 | 10/2004 |
| WO | WO2017/170419 A1 | 10/2017 |

OTHER PUBLICATIONS

Written Opinion issued in International Patent Application No. PCT/JP2019/023193 dated Jul. 23, 2019. 4 pages.

\* cited by examiner

FIG. 1
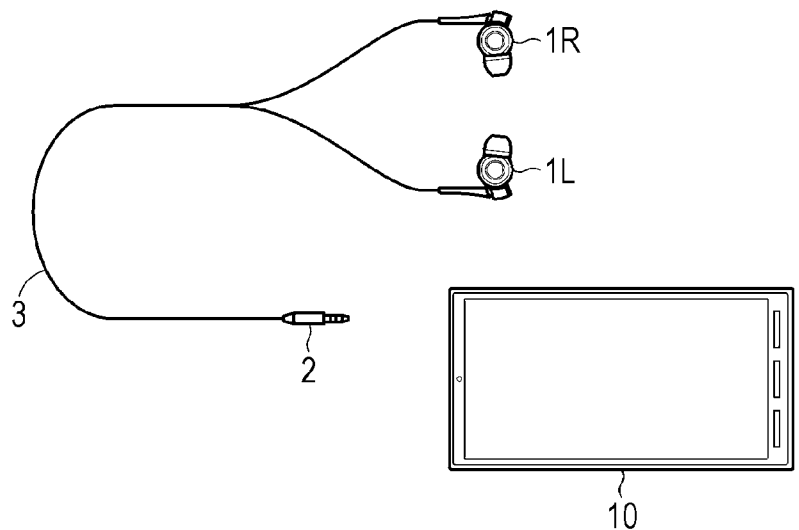
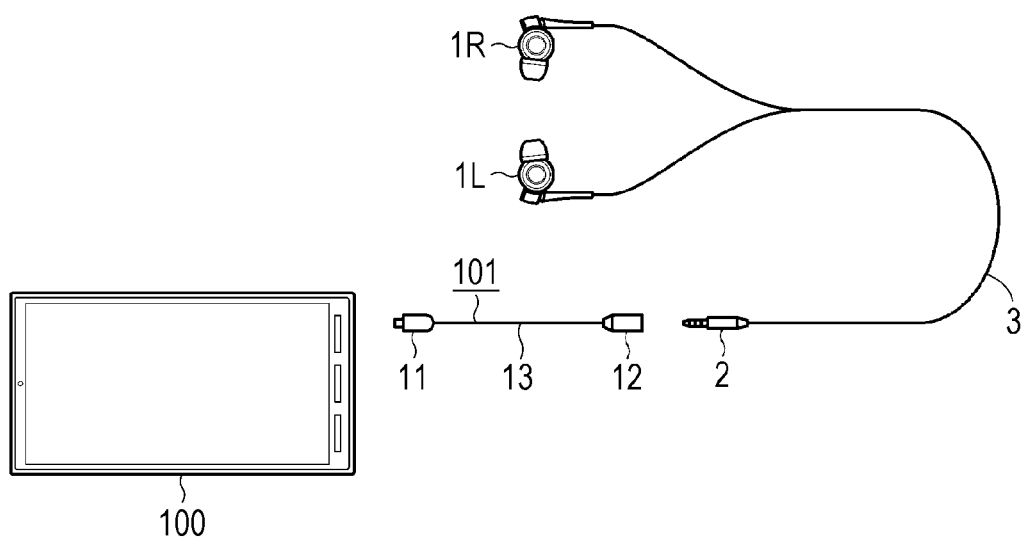

CONVERSION CABLE AND ELECTRONIC DEVICE

TECHNICAL FIELD

The present technology relates to a conversion cable and an electronic device having a digital-to-analog conversion function.

BACKGROUND ART

Jacks (so-called mini jacks) having a diameter of 3.5 mm for analog output have been traditionally used for audio output of an electronic device, for example, a smartphone and a tablet. Digital output has not been performed, and copyright protection has not been required. Due to the influence of the increase in the number of mounted antennas caused by compound eyes of a camera, the increase in battery size, and the increase in compatible frequencies, however, the jacks having a diameter of 3.5 mm are being removed mainly from overseas smartphones, and a similar tendency can be found also within the country.

Nowadays, there is growing use of a connection cable instead of such jacks in order to improve the quality of audio signals output from a smartphone. The connection cable includes an amplifier having a built-in digital analog converter (noted as a DAC as appropriate). The connection cable can be connected to a Lightning terminal or a universal serial bus (USB) terminal of a smartphone. A digital audio signal output from the smartphone is converted into an analog audio signal by a DAC, amplified by an amplifier, and then output. Moreover, the connection cable includes a jack for analog audio signals (e.g., having a diameter of 3.5 mm). A user can connect his/her headphones to the connection cable.

For music content, digital rights management (DRM) (management system for digital content) has been abolished. There has been no problem if digital voice signals are output from a smartphone. Digital output of voice of a terrestrial digital broadcast is, however, prohibited since copyright protection is required. Thus, for example, in a case where digital voice is output by using a connector of USB Type-C, there is no problem with music, but there is a problem that voice of a terrestrial digital broadcast cannot be output. For example, Patent Document 1 discloses a technique for authenticating an accessory device.

CITATION LIST

Patent Document

Patent Document 1: Japanese Patent Application Laid-Open No. 2010-183671

SUMMARY OF THE INVENTION

Problems to be Solved by the Invention

As described above, in a case where a digital voice signal is output from an electronic device, there mixedly exist a digital voice signal that requires copyright protection and a digital voice signal that does not require the copyright protection. In such a situation, there is less need to authenticate an accessory device at all times.

Thus, an object of the present technology is to provide a conversion cable and an electronic device that can perform authentication only in a case of outputting a digital voice signal that requires copyright protection.

Solutions to Problems

The present technology relates to a conversion cable including:
 a connector to be connected to an electronic device that outputs a digital voice signal;
 an IC having a function of converting a digital voice signal supplied through the connector into an analog voice signal; and
 an output unit for an analog voice signal output from the IC,
 in which the IC holds an encryption key for permitting the electronic device to output a digital voice signal that requires copyright protection.

Furthermore, the present technology relates to an electronic device, in which an application for outputting a digital voice signal that requires content protection is installed, the conversion cable is authenticated by using the application with a key held by an IC of a connected conversion cable, and only in a case where the conversion cable is authenticated, a digital voice signal is output to the conversion cable.

Effects of the Invention

According to at least one embodiment, a digital voice signal that requires copyright protection can be output only to a conversion cable that has been authenticated. Note that the effect described here is not necessarily limited, and any of the effects described in the present technology or effects different therefrom may be exhibited. Furthermore, the content of the present technology is not limitedly interpreted by the effects exemplified in the following description.

BRIEF DESCRIPTION OF DRAWINGS

FIG. 1 is a schematic view used for illustrating a usage pattern of the present technology.

MODE FOR CARRYING OUT THE INVENTION

Figure 2:
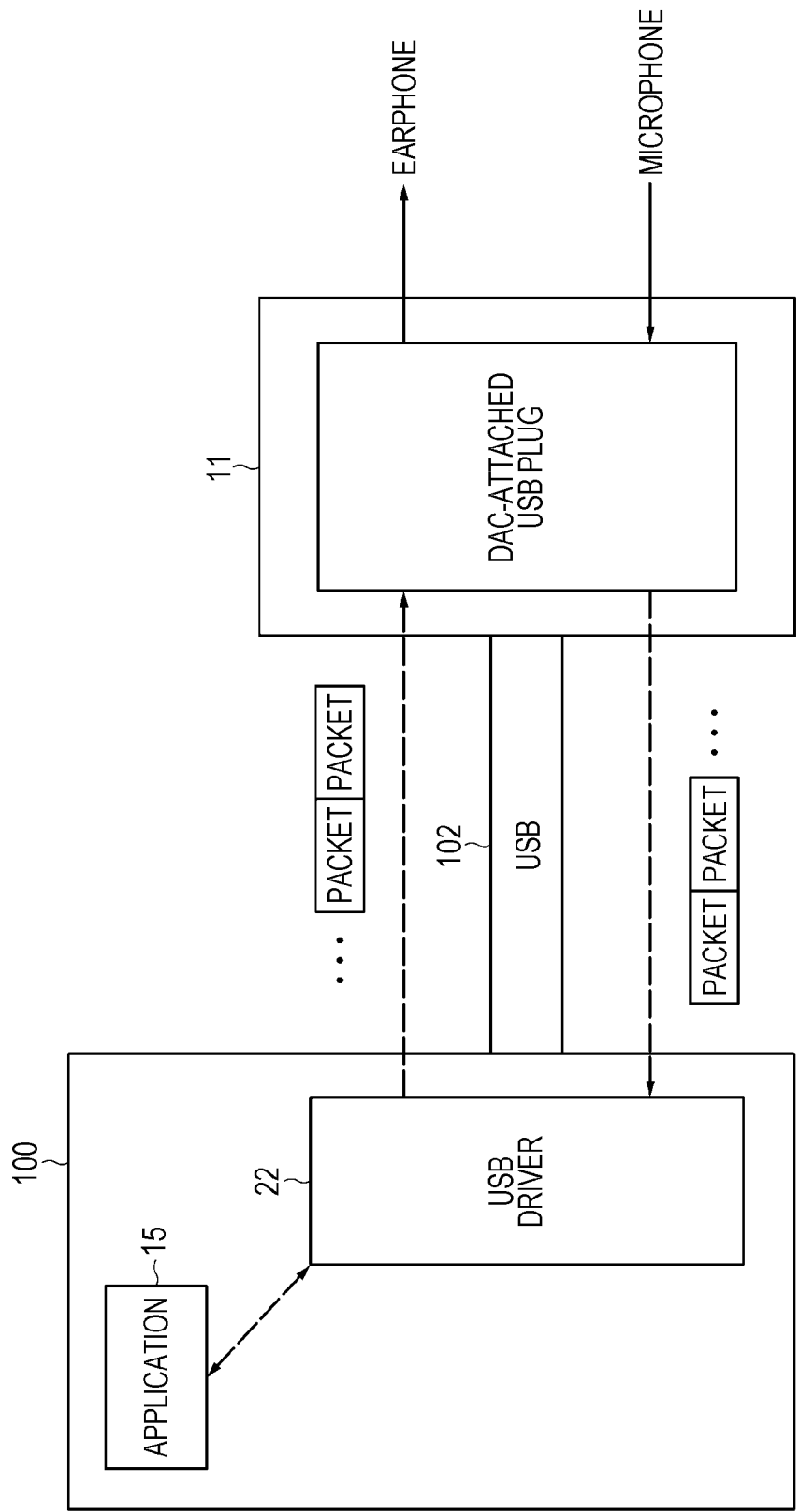
FIG. 2 is a block diagram used for illustrating a system in a case where a digital voice signal that does not require copyright protection is output.
Figure 3:
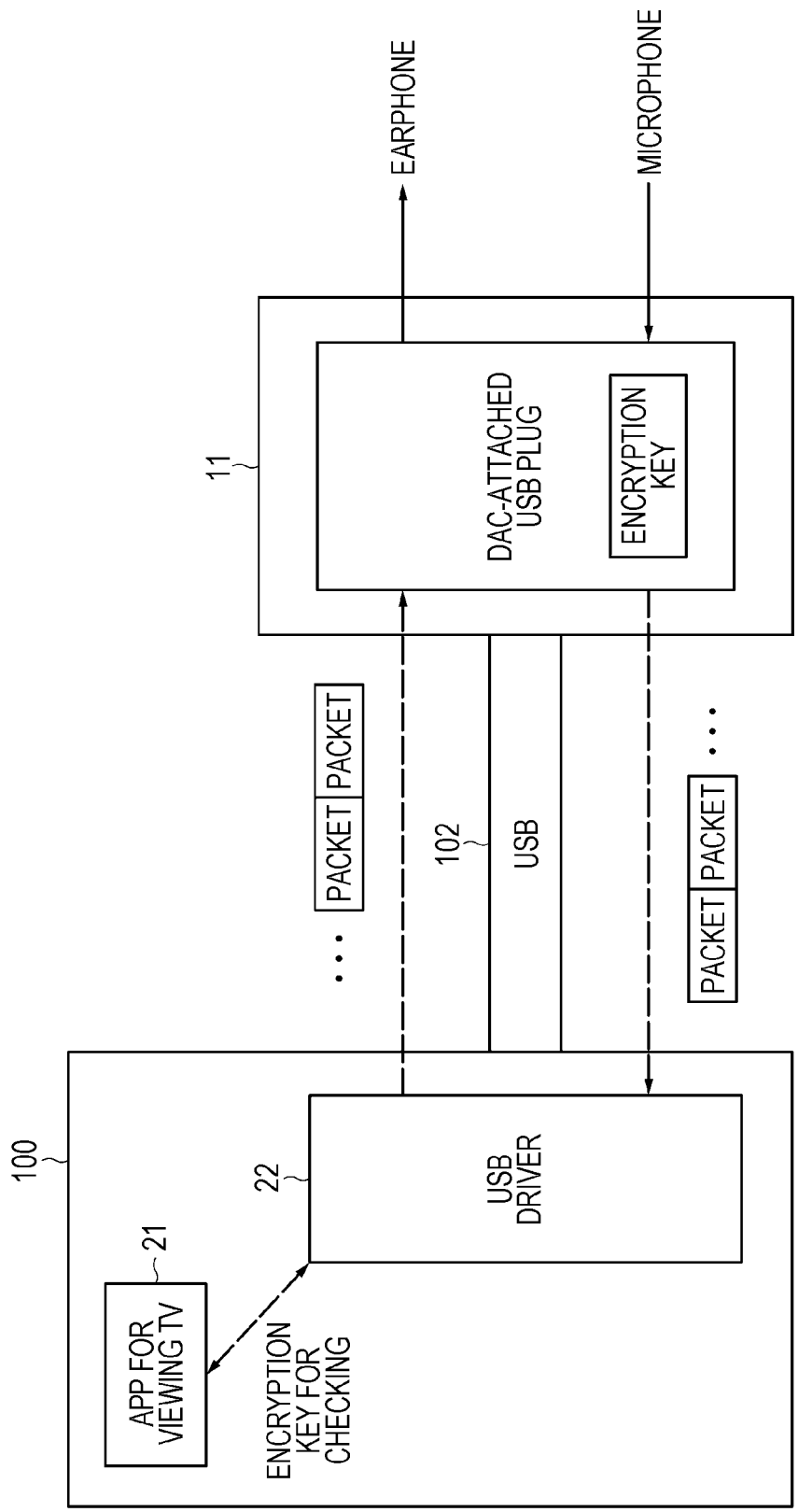
FIG. 3 is a block diagram used for illustrating a system in a case where a digital voice signal that requires copyright protection is output.

The embodiments described below are preferred specific examples of the present technology, and various technically preferable limitations are given. The scope of the present technology is, however, not limited to these embodiments unless it is stated in the following description that the present technology is particularly limited.

Note that the present technology will be described in the following order.
<1. First Embodiment of Present Technology>
<2. Second Embodiment of Present Technology>
<3. Third Embodiment of Present Technology>
<4. Variations>

1. First Embodiment of Present Technology

"Usage Pattern"

A traditional usage pattern and a usage pattern of a first embodiment are outlined with reference to FIG. 1. As illustrated in FIG. 1A, stereo earphones 1R and 1L (simply referred to as earphones 1 in a case where there is no need to distinguish both) have been traditionally used to listen to analog voice output of an electronic device 10. The earphones 1 include an earphone plug 2 and an earphone cable 3. The earphone plug 2 is to be inserted into an audio jack having a diameter of 3.5 mm. The audio jack is provided for the device 10 to output voice. The electronic device 10 includes, for example, a smartphone, a tablet, a PC, and a digital audio player. Note that a headset with a combination of earphones and a microphone may be used instead of the earphones 1.

In recent years, models that that do not include an earphone jack but include only a connector of USB Type-C due to a problem of space efficiency of the electronic device 10 have been increasing. The present technology provides a conversion cable that is applied to such an electronic device. That is, as illustrated in FIG. 1B, the present technology is applied to a case where a digital voice is output from a terminal provided in an electronic device (hereinafter, simply referred to as a device as appropriate) 100, for example, a USB connector (USB receptacle) of USB Type-C. Moreover, the present technology is not limited to a USB interface. The present technology can also be achieved by a connector (including Lightning) used for connecting a mobile device and a peripheral device.

The device 100 includes, for example, a smartphone, a tablet, a PC, and a digital audio player. A connector, for example, a plug of USB Type-C of a conversion cable 101 can be connected to a connector, for example, a connector of USB Type-C of the device 100. The conversion cable 101 includes an integrated circuit (IC) having a function of converting a digital voice signal supplied through the connector into an analog signal. An earphone jack 12 is connected to the IC. The earphone jack 12 serves as an output unit for an analog voice signal through a relay cable 13. The IC holds an encryption key for permitting the device 100 to output a digital voice signal that requires copyright protection.

In the first embodiment, the plug and the IC are integrated in consideration of the fact that the encryption key is more likely to be stolen in a case where the IC is separated from the device 100. In the following description, the part is referred to as a DAC-attached USB plug 11. The earphones 1 similar to traditional earphones can be connected to the earphone jack 12. The DAC is a circuit for converting digital voice data into analog voice data, and also has a function of an amplifier that amplifies a voice signal as needed. Moreover, the DAC-attached USB plug 11 has a function of performing communication and processing for authentication described later.

Note that the USB plug and the DAC can be separately configured instead of being integrally configured. Furthermore, an IC having a function of performing communication and processing for authentication may be separately provided. Moreover, a configuration without the relay cable 13 is possible as a variation of the conversion cable 101. Moreover, although the earphone jack 12 is provided so that the traditional earphones 1 can be used as it is, the earphone jack 12 may be omitted, and the earphones 1 may be connected to the DAC-attached USB plug 11. Moreover, a speaker may be connected instead of the earphones 1. Moreover, a headset can be used instead of the earphones.

The present technology is applied to a case where a digital voice signal that requires copyright protection is output from the device 100. For example, a method of viewing a terrestrial digital broadcast with the device 100 (e.g., smartphone) includes methods as described below.

In a first method, a tuner mounted in the device 100 is used for viewing.

In a second method, viewing is performed via Wi-Fi (registered trademark) by using a router with a built-in tuner.

In a third method, a distributed program is transferred from a dedicated terminal to the device 100 via DTCP-IP to be viewed in real time, or a preliminarily transferred program is viewed in a LAN and mobile environments.

In any of these viewing methods, the device 100 has a limitation in outputting a digital voice signal of a program.

"System Configuration"

FIG. 2 illustrates the configurations of the device 100 and the DAC-attached USB plug 11 of a conversion cable 13 and the connection relation between both. The device 100 includes an application (hereinafter, appropriately referred to as an app) 15 and an audio class driver 22 for a USB. The application 15 is installed for outputting a digital voice signal that does not require copyright protection. The DAC-attached USB plug 11 is connected to a USB connector of the device 100 to form a USB bus 102. FIG. 2 illustrates an example of using a headset. FIG. 2 illustrates paths for a voice signal output from the DAC-attached USB plug 11 to the earphones (earphone jack 12) and a voice signal supplied from a microphone (not illustrated). Moreover, digital voice signals corresponding to these voice signals are input/output through the USB bus 102 between the device 100 and the DAC-attached USB plug 11.

If the device 100 and the DAC-attached USB plug 11 of the conversion cable 101 are inserted into the USB connector of the device 100, the conversion cable 101 is recognized by the audio class driver 22 for a USB included in an operating system (OS) in the device 100 in accordance with a standard of USB audio. In a case where the side of the device 100 requests voice reproduction (OUT transfer), output data from the app 15 is converted into a format (packet) in conformity with a USB communication format via the audio class driver 22, and sent to the USB bus 102.

The DAC-attached USB plug 11 on the side of the conversion cable 101 decrypts a voice signal from packet data of the received digital voice signal, and outputs the decrypted voice signal to the earphones 1 as an analog voice signal. Furthermore, in a case where IN transfer is requested in a headset-attached cable, used for a mobile phone, including a microphone in addition to the earphones 1, conversely, a voice signal acquired by a device from, for example, the microphone is converted into a packet via a DAC IC provided in the conversion cable 101, and passed to the side of the device 100 via the USB bus 102. The audio class driver 22 on the side of the device 100 extracts voice data from the received packet, and passes the voice data to the app.

The above-described processing is a method of outputting a digital voice signal in conformity with a USB audio standard in a case where copyright protection is not required. The present technology is applied to a case where copyright protection is required for a digitally output voice signal. In the present technology, an app for outputting a digital voice signal that requires copyright protection, for example, an app 21 for viewing a digital broadcast is preliminarily installed in the device 100.

The app 21 has an encryption key. The app 21 compares an encryption key preliminarily stored in the IC provided in the DAC-attached USB plug 11 with the encryption key of the app 21 itself. Only if there is no problem in the correspondence relation between both, the digital voice signal is permitted to be output to the DAC-attached USB plug 11. Furthermore, the effectiveness of protection can be increased by performing monitoring in which the side of the device 100 checks the encryption key at regular intervals with the DAC-attached USB plug 11. Note that the encryption key is a key for the app 21 of the device 100 to authenticate the conversion cable 101. The key may be encrypted, but is not required to be encrypted. Furthermore, a digital voice signal output by the device 100 is not encrypted. Note, however, that the digital voice signal may be encrypted.

The present technology as described above has the following effects.

Only in a case of voice information that requires copyright protection, copyright can be protected by the difference between apps without changing the conversion cable 101. Thus, a decrease in versatility of a conversion cable can be prevented, and extra user operation can be made unnecessary.

A processing unit for encrypting and/or decrypting a voice signal is unnecessary. This enables simplified configuration and cost reduction.

The present technology requires only minor changes from the traditional configuration.

Note that a digital voice signal output by the device 100 may be encrypted, but in the case of, for example, terrestrial digital broadcasting, voice processing may take time, and video and voice may be out of synchronization. An apparatus for solving the problem is required, which may complicate the configuration.

"Processing in First Embodiment"

Figure 4:
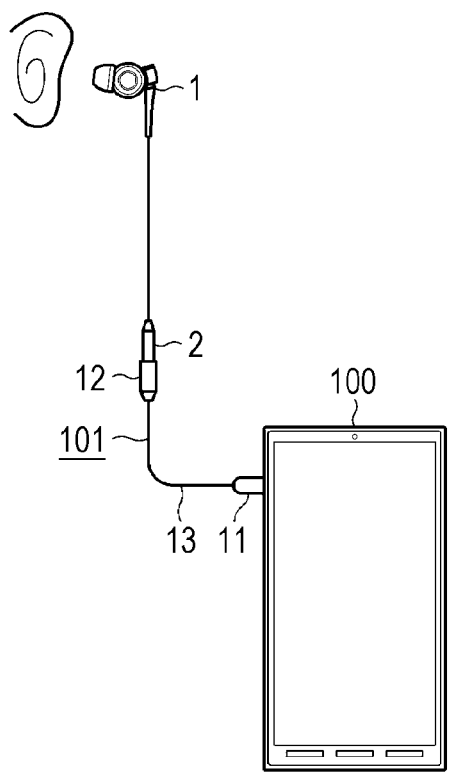
FIG. 4 is a schematic view used for illustrating a usage state in a first embodiment of the present technology.

Next, processing in one embodiment of the present technology will be described. As illustrated in FIG. 4, a digital voice signal output by a smartphone 110 is made audible by inserting the DAC-attached USB plug 11 of the conversion cable 101 into the device 100 (e.g., smartphone) and connecting the earphone plug 2 of the earphones 1 to the earphone jack 12 of the conversion cable 101. Output digital voice signals include a digital voice signal that does not require copyright protection and a digital voice signals that require copyright protection. In the present technology, any digital voice signal can be heard with the earphones 1 in accordance with the type of an activated app. The digital voice signal that requires copyright protection is, for example, voice data of a terrestrial digital broadcast.

Figure 5:
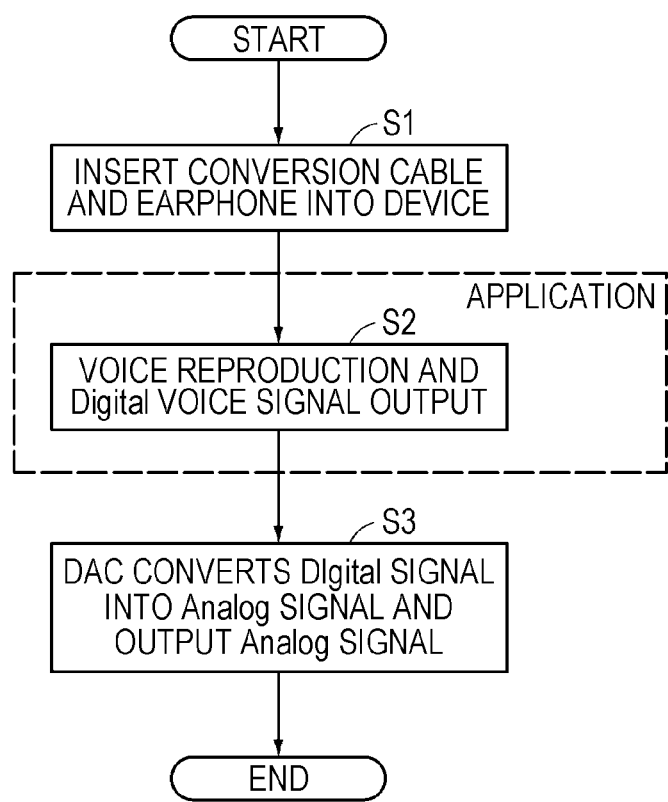
FIG. 5 is a flowchart used for illustrating processing for outputting a digital voice signal that does not require copyright protection.

One example of processing in a case where a digital voice signal that does not require copyright protection is heard will be described with reference to the flowchart of FIG. 5. The processing in the flowchart is executed under the control of the app 15 of the device 100.

Step S1: The DAC-attached USB plug 11 of the conversion cable 101 is inserted into the USB connector of the device 100. The earphone plug 2 is inserted into the earphone jack 12 of the conversion cable 101. The conversion cable 101 is recognized as a USB audio compatible device by a USB audio class driver of the device 100. The app 15 is activated in accordance with a user operation.

Step S2: Voice is reproduced by the app 15 of the device 100, and a digital voice signal is output from the device 100.

Step S3: The DAC in the DAC-attached USB plug 11 converts the digital voice signal into an analog voice signal. The analog voice signal is supplied to the earphone 1, and the voice signal can be heard through the earphone 1.

One example of processing in a case where a digital voice signal that requires copyright protection is heard will be described with reference to the flowchart of FIG. 6. The processing in the flowchart is executed under the control of the app 21 of the device 100. This type of digital voice signal can be heard only with a legitimate conversion cable, which has a predetermined encryption key preliminarily stored in the DAC IC or the outside with high security.

Step S11: The DAC-attached USB plug 11 of the conversion cable 101 is inserted into the USB connector of the device 100. The earphone plug 2 is inserted into the earphone jack 12 of the conversion cable 101.

Step S12: Whether or not the conversion cable 101 is a USB audio compatible device is authenticated by the USB audio class driver of the device 100. Note that, although not illustrated in the processing of the flowchart of FIG. 5, cable authentication processing is performed.

Step S13: In a case where the conversion cable 101 is not authenticated as a compatible device (NG) in Step S12, a message indicating that the conversion cable 101 is not a compatible device is displayed on a screen. Then, the processing returns to Step S11.

Step S14: In a case where the conversion cable is authenticated as a USB audio compatible device (OK) in Step S12, an app in accordance with a user operation, for example, the app 21 for viewing a terrestrial digital broadcast is activated.

Step S15: Encryption keys are collated. That is, whether or not the conversion cable 101 is a legitimate conversion cable is authenticated by determining whether or not an encryption key on the side of the app and an encryption key on the side of the conversion cable match each other. Note that, although match/mismatch is used as a collation result in the following description, in a case where two encryption keys have a predetermined relation, the collation result may be set as OK even in a case where the collation result is mismatch. A specific example of collation processing for encryption keys will be described later. The side of the app controls collation timing. For example, collation at regular intervals, collation at the time when cable connection/disconnection is detected, collation at the time when a device performs screen transition, or collation at the timing at which voice is not interrupted is considered as the collation timing.

Step S16: In a case where the conversion cable is determined to be legitimate, that is, in a case where the collation result in Step S15 is OK, digital voice data of a terrestrial digital broadcast program is output from the device 100.

Step S17: In a case where the encryption key on the side of the app and the encryption key on the side of the conversion cable mismatch as the collation result in Step S16, a message prompting the insertion of a legitimate conversion cable is displayed, and the app is quit. Then, the processing returns to Step S11.

Step S18: Although the encryption keys are collated in Step S15, in a case where the first collation result alone is considered to be unreliable, the encryption keys are monitored. After collating the encryption keys, the encryption keys are collated during outputting of digital voice. In a case where the collation result is NG, the processing of Step S17 is performed. The monitoring processing is not necessarily required to be performed.

Step S19: If the digital voice data is output in Step S16, the digital voice data is converted into an analog voice signal by the DAC in the DAC-attached USB plug 11.

Step S20: The analog voice signal is supplied to the earphone 1 via an earphone cable, and voice can be heard through the earphone 1.

The encryption key on the side of the app and the encryption key on the side of the conversion cable are collated in this way. Thus, only in a case where a legitimate conversion cable is inserted into the device, the digital voice data is output from the device.

Figure 6:
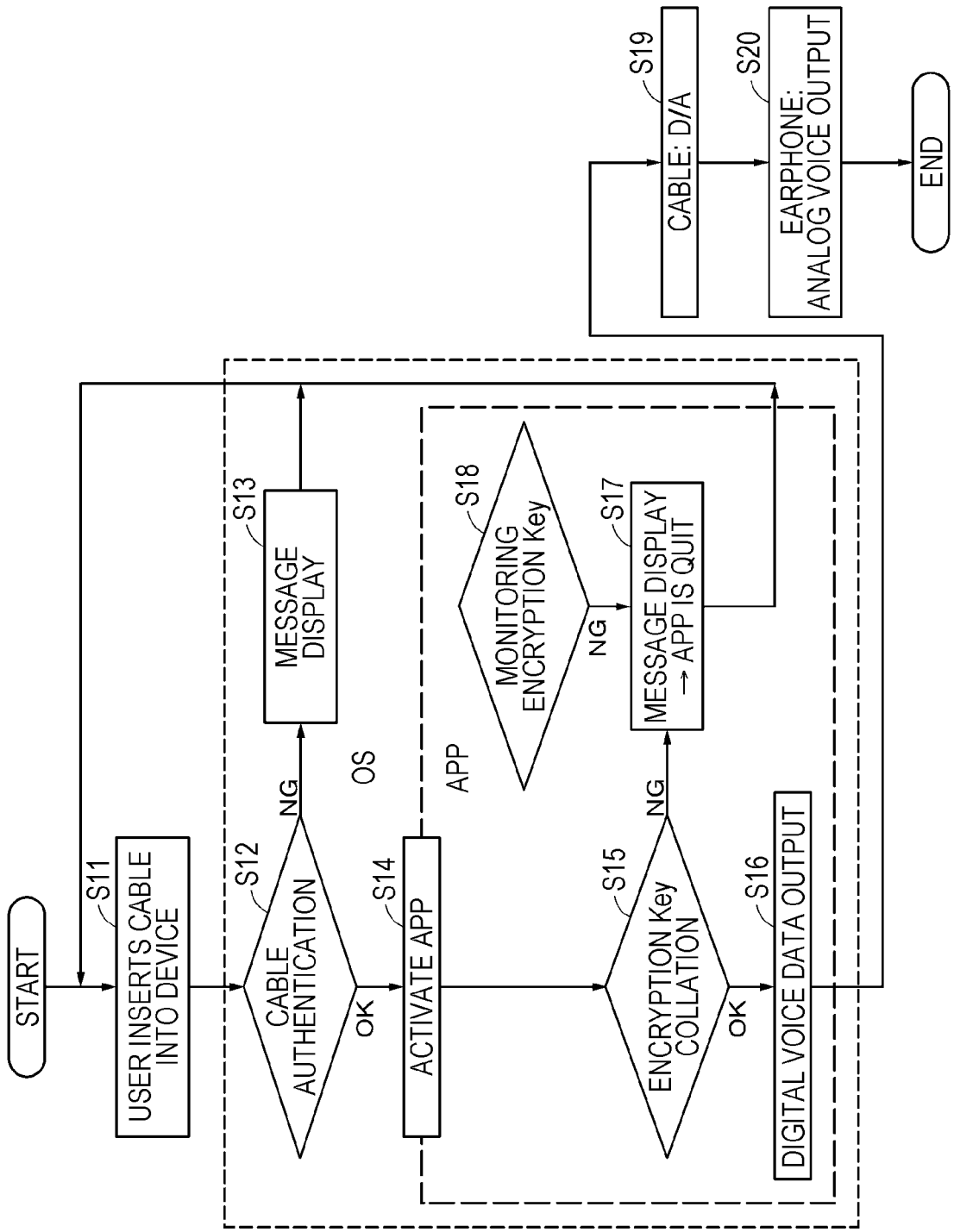
FIG. 6 is a flowchart used for illustrating one example of the processing for outputting a digital voice signal that requires copyright protection.
Figure 7:
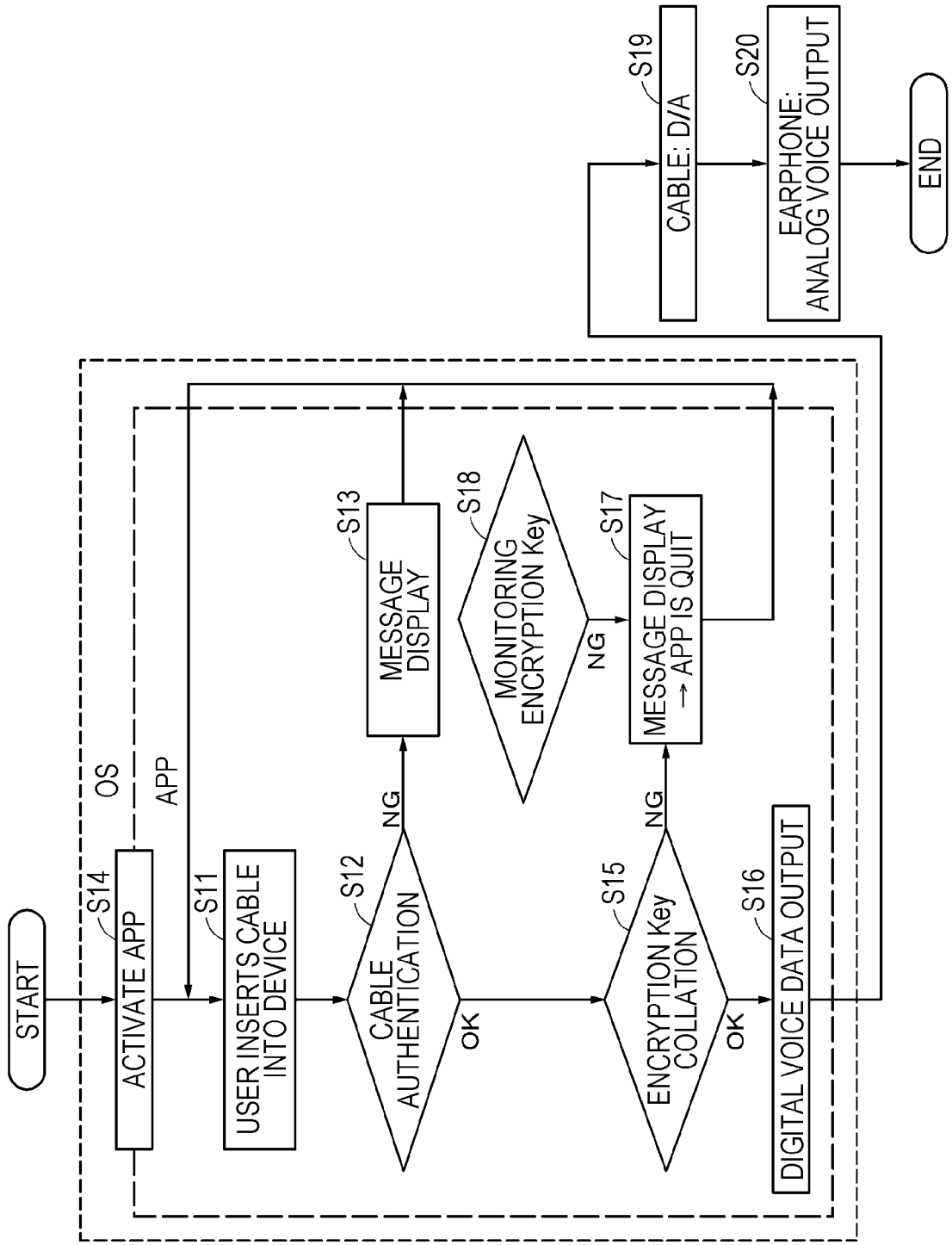
FIG. 7 is a flowchart used for illustrating another example of the processing for outputting a digital voice signal that requires copyright protection.

FIG. 7 is a flowchart illustrating processing obtained by partially modifying the processing in FIG. 6. In the processing in FIG. 6, a platform (OS) of the device 100 performs cable authentication processing (Step S12). In contrast, in the processing in FIG. 7, an app, for example, the app 21 for viewing a terrestrial digital broadcast is first activated in response to a user operation (Step S14). Afterwards, the DAC-attached USB plug 11 of the conversion cable 101 is inserted into the USB connector of the device 100 (Step S11). Then, the app 21 performs cable authentication processing (Step S12). The subsequent processing is similar to that in FIG. 6.

Figure 8:
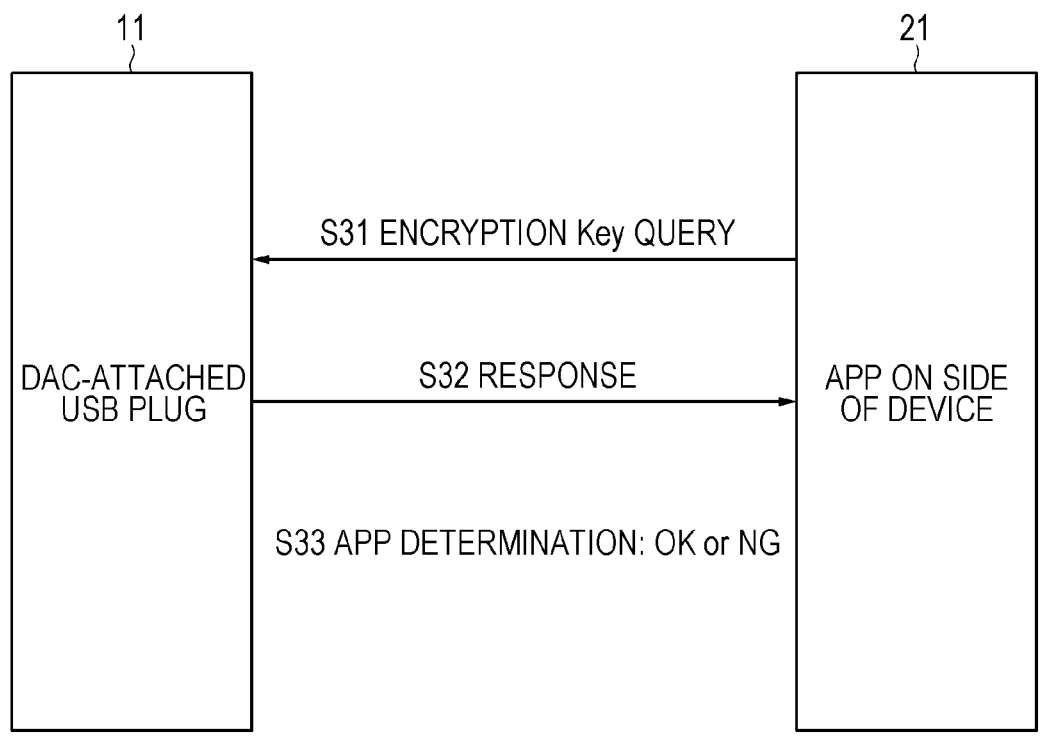
FIG. 8 is a schematic diagram for illustrating one example of authentication processing using an encryption key.

The collation processing (Step S15) for encryption keys will be described with reference to FIG. 8. The DAC-attached USB plug 11 in the case of a legitimate conversion cable has a known encryption key. The "known" means that key information is shared between the app 21 of the device 100 and the IC of the conversion cable 101.

Step S31: The app 21 of device 100 queries the DAC-attached USB plug 11 for the encryption key. Note, however, that, in a case where the DAC-attached USB plug 11 is inserted without the query, the encryption key may be sent from the DAC-attached USB plug 11 to the app 21.

Step S32: The DAC-attached USB plug 11 responds to send the encryption key to the device 100. Step S33: Collation processing for determining whether or not the encryption key matches the encryption key of the app 21 is performed. In a case where a known encryption key is received, the encryption keys match each other. The collation result (OK/NG) is acquired.

Another example of the processing in a case where a digital voice signal that requires copyright protection is heard will be described with reference to the flowchart of FIG. 9. The same reference sign is given to the part corresponding to the example of the above-described processing.

Step S11: The DAC-attached USB plug 11 of the conversion cable 101 is inserted into the USB connector of the device 100. The earphone plug 2 is inserted into the earphone jack 12 of the conversion cable 101.

Step S12: Whether or not the conversion cable 101 is a USB audio compatible device is authenticated by the USB audio class driver of the device 100.

Step S13: In a case where the conversion cable 101 is not authenticated as a compatible device (NG) in Step S12, a message indicating that the conversion cable 101 is not a compatible device is displayed on a screen.

Step S14: In a case where the conversion cable is authenticated as a USB audio compatible device (OK) in Step S12, an app in accordance with a user operation, for example, an app for viewing television is activated.

Step S15: Encryption keys are collated. That is, whether or not the conversion cable 101 is a legitimate conversion cable is authenticated by determining whether or not the encryption key on the side of the app and an encryption key received from the conversion cable match each other. A specific example of collation processing for encryption keys will be described later. The side of the app controls collation timing. For example, collation at regular intervals, collation at the time when cable connection/disconnection is detected, collation at the time when a device performs screen transition, or collation at the timing at which voice is not interrupted is considered as the collation timing.

Step S16: In a case where the conversion cable is determined to be legitimate, that is, in a case where the collation result in Step S15 is OK, digital voice data is output from the device 100.

Figure 9:
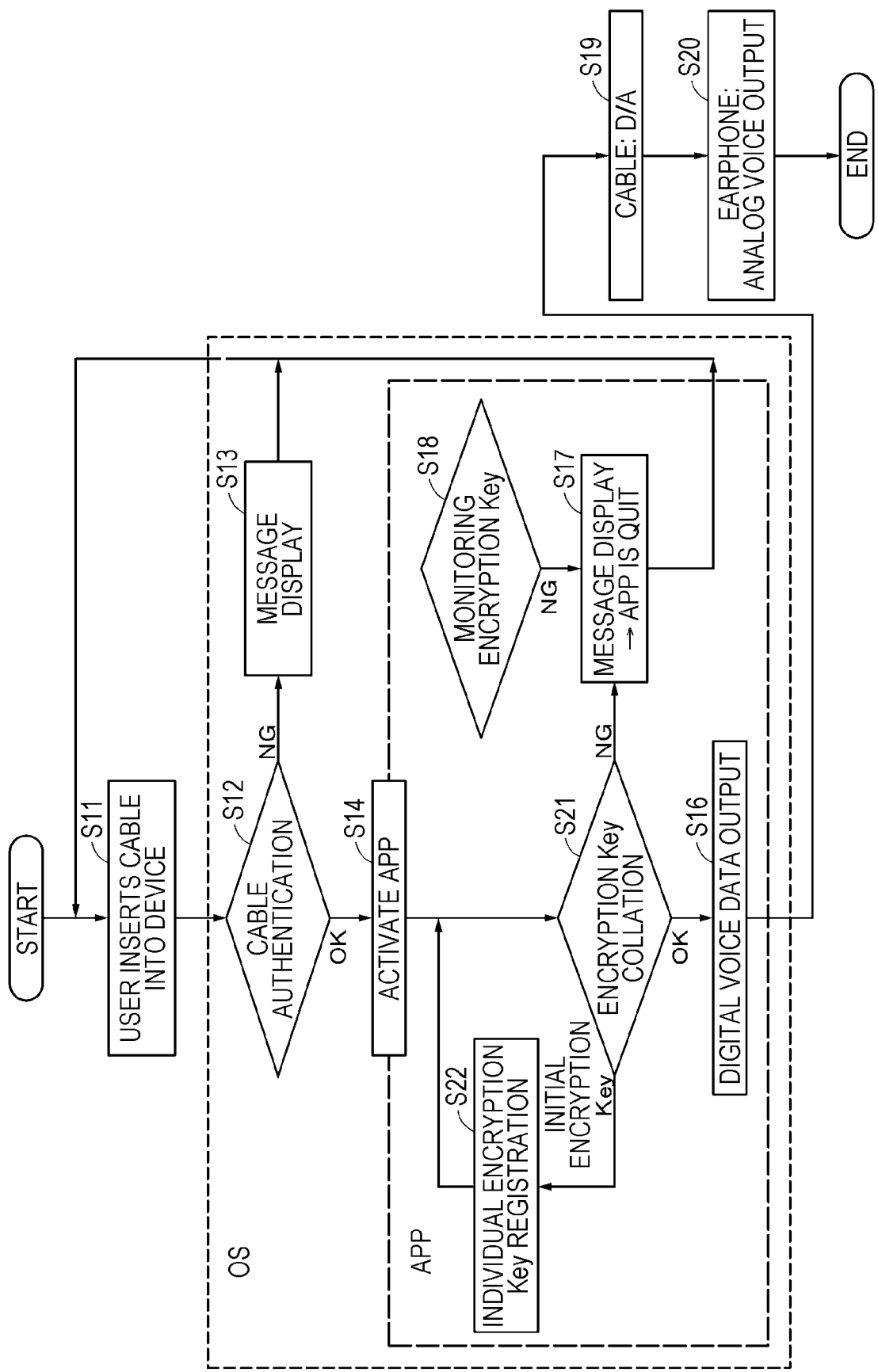
FIG. 9 is a flowchart used for illustrating another example of the processing for outputting a digital voice signal that requires copyright protection.
Figure 10:
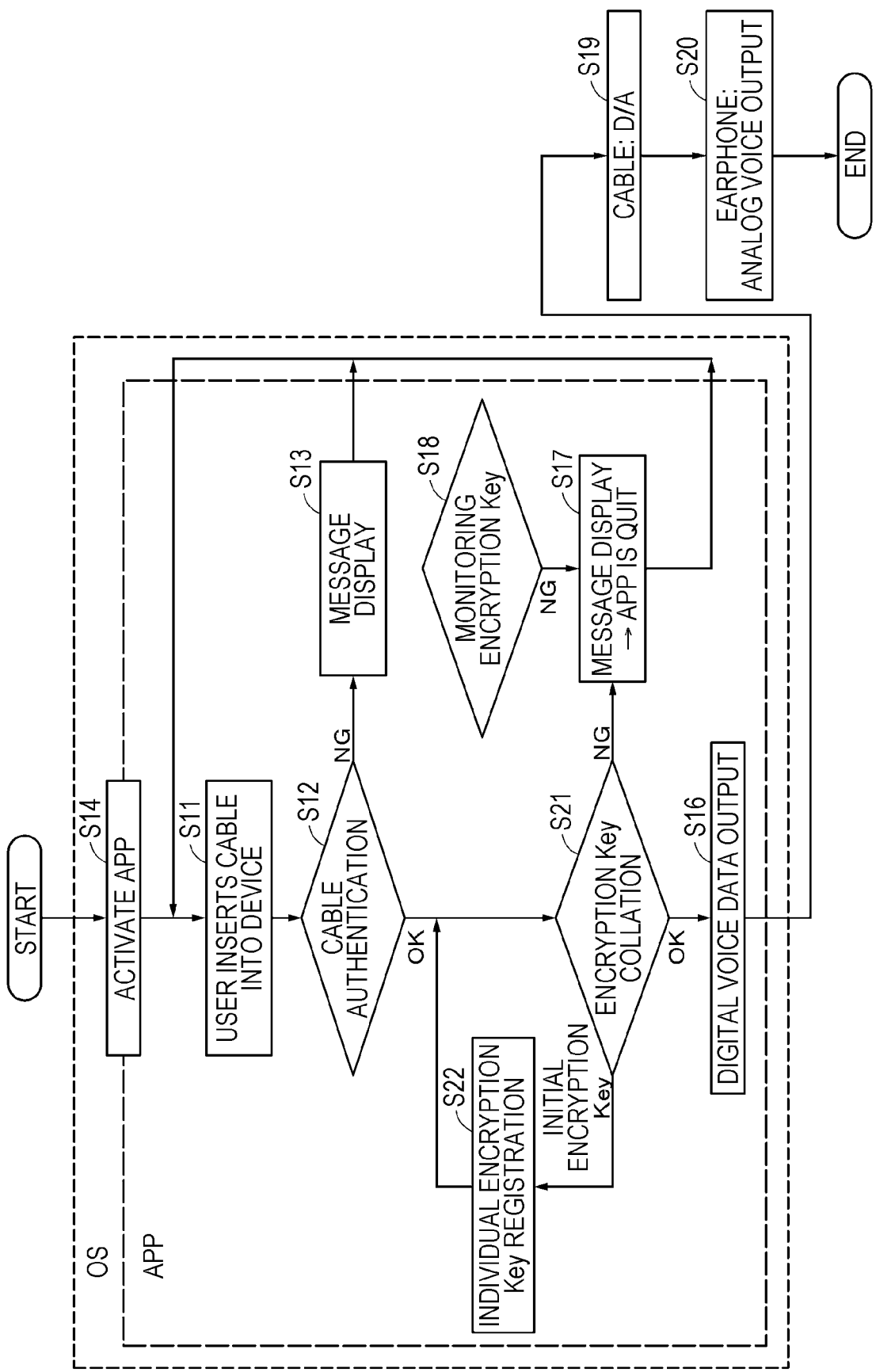
FIG. 10 is a flowchart used for illustrating another example of the processing for outputting a digital voice signal that requires copyright protection.

FIG. 10 is a flowchart illustrating processing obtained by partially modifying the processing in FIG. 9. In the processing in FIG. 9, the platform (OS) of the device 100 performs the cable authentication processing (Step S12). In contrast, in the processing in FIG. 10, an app, for example, the app 21 for viewing a terrestrial digital broadcast is first activated in response to a user operation (Step S14). Afterwards, the DAC-attached USB plug 11 of the conversion cable 101 is inserted into the USB connector of the device 100 (Step S11). Then, the app 21 performs cable authentication processing (Step S12). The subsequent processing is similar to that in FIG. 9.

Figure 11:
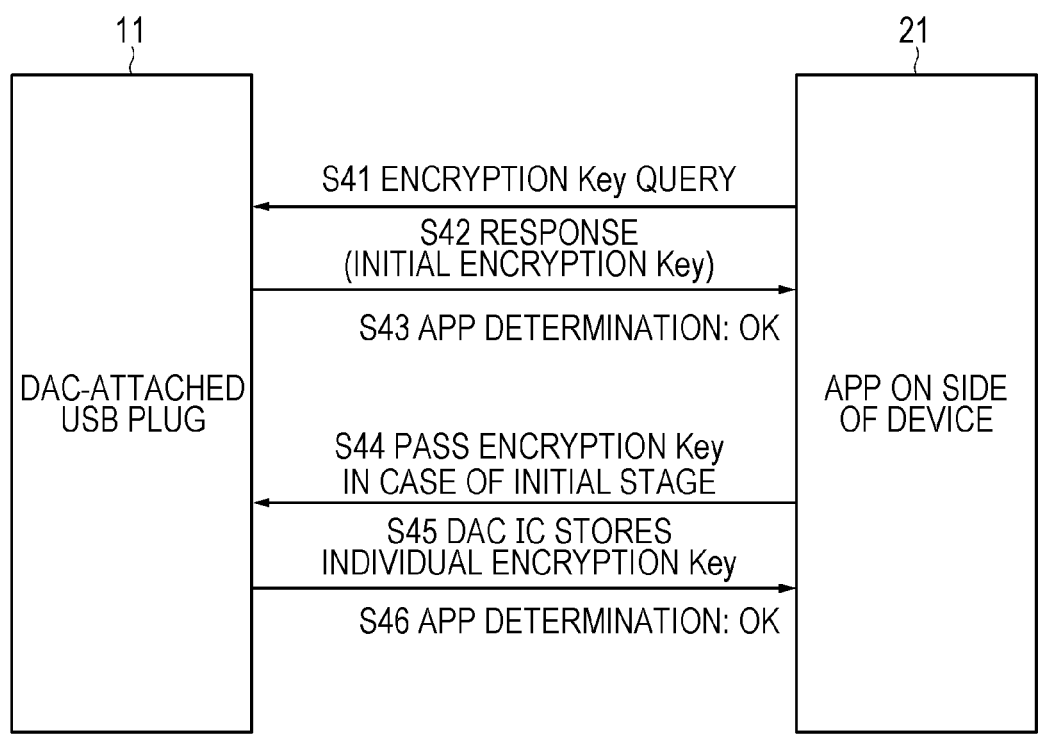
FIG. 11 is a schematic diagram for illustrating another example of the authentication processing using an encryption key.

The collation processing (Steps S21 and S22) for encryption keys will be described with reference to FIG. 11. The DAC-attached USB plug 11 of the conversion cable 101 has a known initial encryption key. The app 21 has known encryption key information and solid encryption key information.

Step S41: In a case where the conversion cable 101 is inserted into the device 100, the app 21 of device 100 queries the DAC-attached USB plug 11 for the initial encryption key.

Step S42: The DAC-attached USB plug 11 responds to send the initial encryption key to the device 100.

Step S43: The app 21 determines whether the received key matches the initial encryption key.

Step S44: In a case where the received key is the initial encryption key, the app 21 passes the solid encryption key to the DAC-attached USB plug 11.

Step S45: The solid encryption key received by the DAC-attached USB plug 11 is stored, and the app 21 is notified of the stored solid encryption key.

Step S46: The app 21 determines whether or not the encryption key stored by the DAC-attached USB plug 11 matches the solid encryption key passed in Step S44. In a case where the solid encryption key stored by the DAC-attached USB plug 11 matches the encryption key passed by the app 21, the DAC-attached USB plug 11 and the app 21 are paired. No digital voice data is output except for the DAC-attached USB plug 11 that has been paired (authenticated).

In another example of the above-described encryption key collation processing, the app 21 passes the encryption key to the DAC-attached USB plug 11 of the conversion cable 101, and the encryption key received by the DAC-attached USB plug 11 is registered. Thus, a conversion cable having an initial encryption key can be paired with a different device, so that the versatility of the conversion cable 101 is improved.

2. Second Embodiment of Present Technology

A second embodiment of the present technology will be described with reference to FIG. 12. In the second embodiment, in a manner similar to that of the first embodiment, a conversion cable 101 is used. The conversion cable 101 has the configuration in which a DAC-attached USB plug 11 and an earphone jack 12 are connected by a relay cable 13. Moreover, an antenna, for example, a reception antenna for a terrestrial digital broadcast is configured by using the conversion cable 101.

Figure 12:
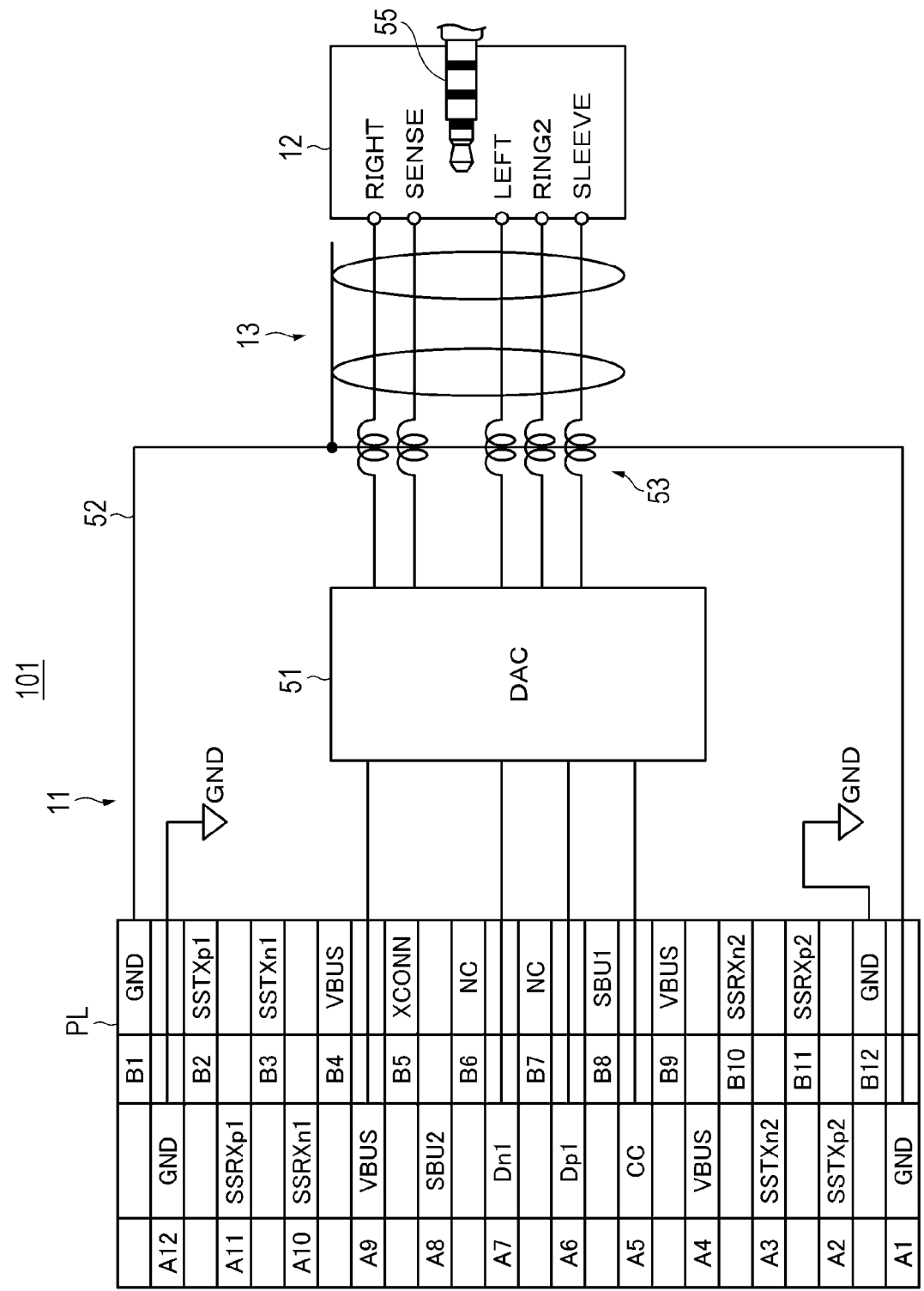
FIG. 12 is a schematic diagram used for illustrating a second embodiment of the present technology.

FIG. 12 illustrates a USB plug, for example, a plug PL of USB Type-C, and a DAC 51. The DAC 51 is an IC having a function of converting a digital voice signal into an analog voice signal and a function of communicating with a device 100 for authentication. The connection relation with pins related to the present technology among pins of the plug PL is illustrated. Note that the present technology can also be applied to a reversible specification other than a USB Type-C standard, such as Lightning. Furthermore, in the present specification, the term RF signal or antenna signal is used to mean, for example, an output signal (including an amplified signal) of the antenna itself, an antenna signal from an external antenna supplied via an RF connector, and a signal wirelessly transmitted by converting the frequency of an antenna signal.

Four poles of earphone plugs 55 can be inserted into the earphone jack 12 in one example. In the case, five transmission lines are formed in the relay cable 13. The transmission lines include a left channel signal (LEFT) and a right channel signal (RIGHT). Moreover, a cable including a shield wire 52 of braided copper wire is used as the relay cable 13. An antenna cable is configured by the shield wire 52. The antenna cable is connected to an antenna signal input terminal of a tuner in the device 100. A high-frequency blocking component 53 is interposed between the DAC-attached USB plug 11 and the relay cable 13. The high-frequency blocking component 53 has a high impedance at a frequency desired to be received, and includes, for example, an inductor and a ferrite bead.

"USB Type-C"

The USB Type-C is a reversible connector that can be inserted into a receptacle with any of a front side or a back side facing up, and that has power delivery and high-speed transmission. FIG. 12 illustrates arrays of two sets of pins of the plugs PL of USB Type-C. One array (A side) and the other array (B side) each have 12 pins. Similarly on the side where the plug PL is to be inserted (receptacle), twelve contacts are provided on each of the A side and the B side. The A sides of a plug and a receptacle may be connected, or the A side and the B side may be connected.

In the USB Type-C, pin assignment is specified as follows.

A side
A1: GND: Ground
A2: SSTXp1: + Side of data transmission specified by USB 3.1
A3: SSTXn1: − Side of data transmission specified by USB 3.1
A4: VBUS: Bus power
A5: CC1: Configuration channel
A6: Dp1 (or D+): + Side of data transmission specified by USB 2.0
A7: Dn1 (or D−): − Side of data transmission specified by USB 2.0
A8: SBU1: Sideband use
A9: VBUS: Bus power
A10: SSRXn2: − Side of data transmission specified by USB 3.1
A11: SSRXp2: + Side of data transmission specified by USB 3.1
A12: GND: Ground
B side
B12: GND: Ground
B11: SSRXp2: + Side of data transmission specified by USB 3.1
B10: SSRXn2: − Side of data transmission specified by USB 3.1
B9: VBUS: Bus power
B8: SBU2: Sideband use
B7: Dn2 (or D+): + Side of data transmission specified by USB 2.0
B6: Dp2 (or D−): − Side of data transmission specified by USB 2.0
B5: CC2: Configuration channel
B4: VBUS: Bus power
B3: SSTXn2: − Side of data transmission specified by USB 3.1
B2: SSTXp2: + Side of data transmission specified by USB 3.1
B1: GND: Ground In one example, data from a pin A6 (Dp1) and a pin A7 (Dn1) of the plug PL is input to the DAC 51 by differential transmission. Moreover, a pin A5 (CC1) and a pin A9 (VBUS) of the plug PL are connected to the DAC 51. Five analog signals are output from the DAC 51. The relay cable 13 (shield wire 52) is set to have a length in accordance with the frequency band desired to be received. That is, the shield wire 52 functions as a monopole antenna. For example, the relay cable 13 is set to have a length of approximately $\lambda/4$ ($\lambda$: wavelength of the received frequency). The shield wire 52 is connected to pins A1 and B1 of the plug PL. Thus, an antenna signal is supplied to the pins A1 and B1 of the plug PL1. These pins A1 and B1 are positioned diagonally in the pin array.

The above-described conversion cable 101 in the second embodiment operates as an antenna-attached cable. For example, voice of a program that is being viewed can be heard through the earphones 1 while a television broadcast is received by the device 100. Moreover, regardless of which of the front side or the back side faces up, an antenna signal is input from one of the pins A1 and B1 to a tuner in a case where the plug PL is inserted into the receptacle.

3. Third Embodiment of Present Technology

A third embodiment of the present technology will be described with reference to FIGS. 13A and 13B. The third embodiment is an example in which a reception unit (referred to as an adapter or a dongle) 201 connectable to a connection terminal (USB terminal or Lightning) of the device 100 is used. In a case where the device 100 does not have a function of receiving a terrestrial digital broadcast, connection of the reception unit 201 enables the reception of the terrestrial digital broadcast.

Figure 13:
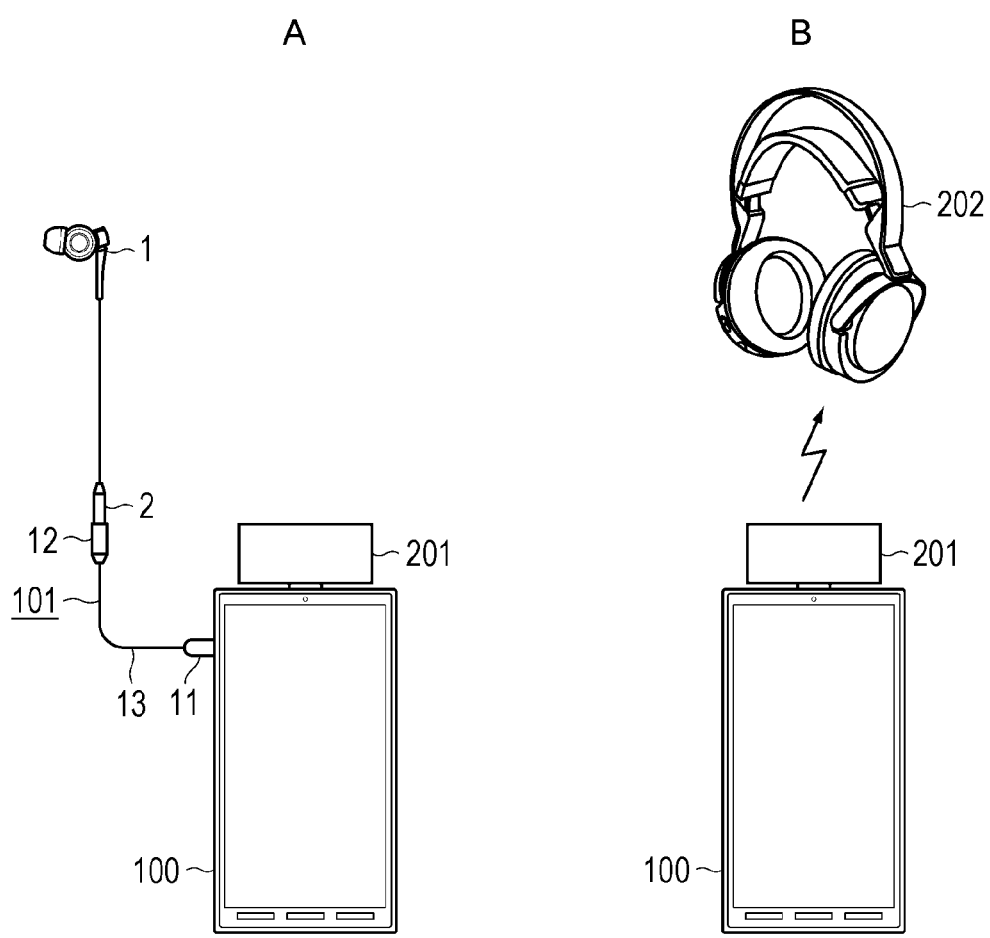
FIG. 13 is a schematic view used for illustrating a third embodiment of the present technology.

As illustrated in FIG. 13A, voice can be heard by inserting the DAC-attached USB plug 11 of the above-described conversion cable 101 into the USB connector of the device 100. The USB plug 11 of the conversion cable 101 may be inserted into the reception unit 201 instead of the USB connector. Note that the present technology can be applied to the case where voice output of the reception unit 201 can be heard through wireless headphones 202 as illustrated in FIG. 13B.

4. Variations

Although the embodiments of the present technology have been specifically described above, the present technology is not limited to each of the above-described embodiments, and various variations based on the technical idea of the present technology are possible. Furthermore, the configurations, methods, processes, shapes, materials, numerical values, and the like of the above-described embodiments can be combined with each other insofar as the combination does not depart from the spirit of the present technology.

REFERENCE SIGNS LIST

1 Earphone
2 Earphone plug
3 Earphone cable
10, 100 Electronic device
101 Conversion cable
12 Earphone jack
13 Relay cable
15, 21 Application
51 DAC
52 Shield wire

The invention claimed is:

1. A conversion cable comprising:
a connector to be connected to an electronic device that outputs a digital voice signal;
an IC having a function of converting a digital voice signal supplied through the connector into an analog voice signal; and
an output unit for an analog voice signal output from the IC,
wherein the IC holds an encryption key for permitting the electronic device to output a digital voice signal that requires copyright protection,
a relay cable connects the IC and the output unit,
the relay cable is a coaxial structure line, and a shield wire of the coaxial structure line functions as an antenna for receiving a digital broadcast,
the connector has a configuration of a plug,
an RF signal of a digital broadcast is supplied to the plug,
a first array including a plurality of pins and a second array including a plurality of pins are provided substantially in parallel in the plug, and
both or any of a first pin and a second pin is set for supplying an RF signal, the first pin being included in the first array, the second pin being included in the second array and positioned diagonally to the first pin.

2. The conversion cable according to claim 1, wherein, in a case where an electronic device executes an application for outputting a digital voice signal that requires the copyright protection, authentication processing using the encryption key is performed.

3. The conversion cable according to claim 1, wherein, in a case where an electronic device executes an application for outputting a digital voice signal that does not require copyright protection, authentication processing using the encryption key is not performed.

4. The conversion cable according to claim 1, wherein a signal line between an electronic device and the connector uses differential transmission.

5. The conversion cable according to claim 1, wherein the output unit for a voice signal is an earphone jack, an earphone, a headset, or a speaker for analog.

6. An electronic device, wherein an application for outputting a digital voice signal that requires content protection is installed, the conversion cable according to claim 1 is authenticated by using the application with the encryption key, and only in a case where the conversion cable is authenticated, a digital voice signal is output to the conversion cable.

7. The electronic device according to claim 6, wherein the electronic device is a mobile device.

8. The electronic device according to claim 6, wherein a unit is connectable to a connection terminal, and in a case where the conversion cable is authenticated, a digital voice signal is output from the unit to the conversion cable.

9. The electronic device according to claim 7, wherein the mobile device is one of a smartphone or a tablet.

* * * * *